US009926913B2

(12) United States Patent
Noto

(10) Patent No.: US 9,926,913 B2
(45) Date of Patent: Mar. 27, 2018

(54) SYSTEM AND METHOD FOR REMOTELY RESETTING A FAULTED WIND TURBINE

(71) Applicant: General Electric Company, Schenectady, NY (US)

(72) Inventor: William Borea Noto, Niskayuna, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 312 days.

(21) Appl. No.: 14/703,934

(22) Filed: May 5, 2015

(65) Prior Publication Data

US 2016/0327025 A1 Nov. 10, 2016

(51) Int. Cl.
| | |
|---|---|
| *G05D 17/00* | (2006.01) |
| *F03D 7/04* | (2006.01) |
| *H02K 7/18* | (2006.01) |
| *G05B 15/02* | (2006.01) |
| *F03D 17/00* | (2016.01) |
| *H02J 3/38* | (2006.01) |

(52) U.S. Cl.
CPC ............ *F03D 7/047* (2013.01); *F03D 7/043* (2013.01); *F03D 7/048* (2013.01); *F03D 17/00* (2016.05); *G05B 15/02* (2013.01); *H02J 3/386* (2013.01); *H02K 7/1838* (2013.01); *Y02E 10/723* (2013.01); *Y02E 10/725* (2013.01); *Y02E 10/763* (2013.01)

(58) Field of Classification Search
CPC .......... F03D 7/047; F03D 7/043; F03D 7/048; F03D 17/00
See application file for complete search history.

(56) References Cited

U.S. PATENT DOCUMENTS

| | | | | |
|---|---|---|---|---|
| 5,276,863 A | * | 1/1994 | Heider | G06F 11/2294 709/222 |
| 5,936,529 A | * | 8/1999 | Reisman | G07C 9/00111 340/539.1 |
| 2010/0013227 A1 | * | 1/2010 | Weitkamp | F03D 7/0264 290/44 |
| 2011/0054825 A1 | * | 3/2011 | Perla | G05B 23/0286 702/113 |
| 2013/0254586 A1 | * | 9/2013 | Winger | G06F 11/0793 714/3 |
| 2013/0289911 A1 | * | 10/2013 | Patel | H02M 5/4585 702/65 |

(Continued)

FOREIGN PATENT DOCUMENTS

| | | |
|---|---|---|
| CA | 2810823 | 3/2013 |
| CN | 102644545 B | 7/2013 |
| WO | WO 2012/092319 A1 | 7/2012 |

*Primary Examiner* — Vincent Tran
(74) *Attorney, Agent, or Firm* — Dority & Manning, P.A.

(57) ABSTRACT

In one aspect, a computer-implemented method for remotely resetting faulted wind turbines may generally include receiving fault data associated with a turbine fault that has occurred for a faulted wind turbine, analyzing one or more reset conditions associated with the turbine fault; determining whether the faulted wind turbine is remotely resettable based on the one or more reset conditions associated with the turbine fault and if the turbine fault is remotely resettable, transmitting a reset notification to a client device authorized to receive notifications for the wind turbine, wherein the reset notification indicates that the faulted wind turbine can be remotely reset.

20 Claims, 8 Drawing Sheets

(56) References Cited

U.S. PATENT DOCUMENTS

2015/0242851 A1* 8/2015 Wall ..................... H04W 12/04
705/71
2015/0373119 A1* 12/2015 Kaneko ............... H04L 67/1097
709/219

* cited by examiner

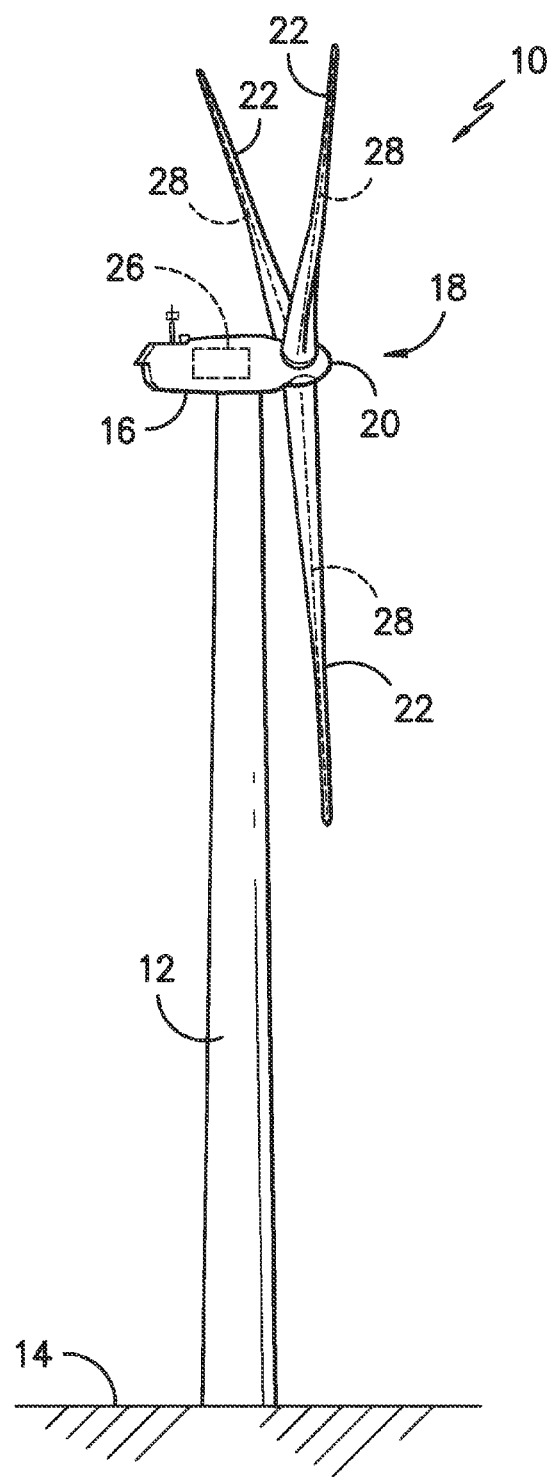
FIG. -1-

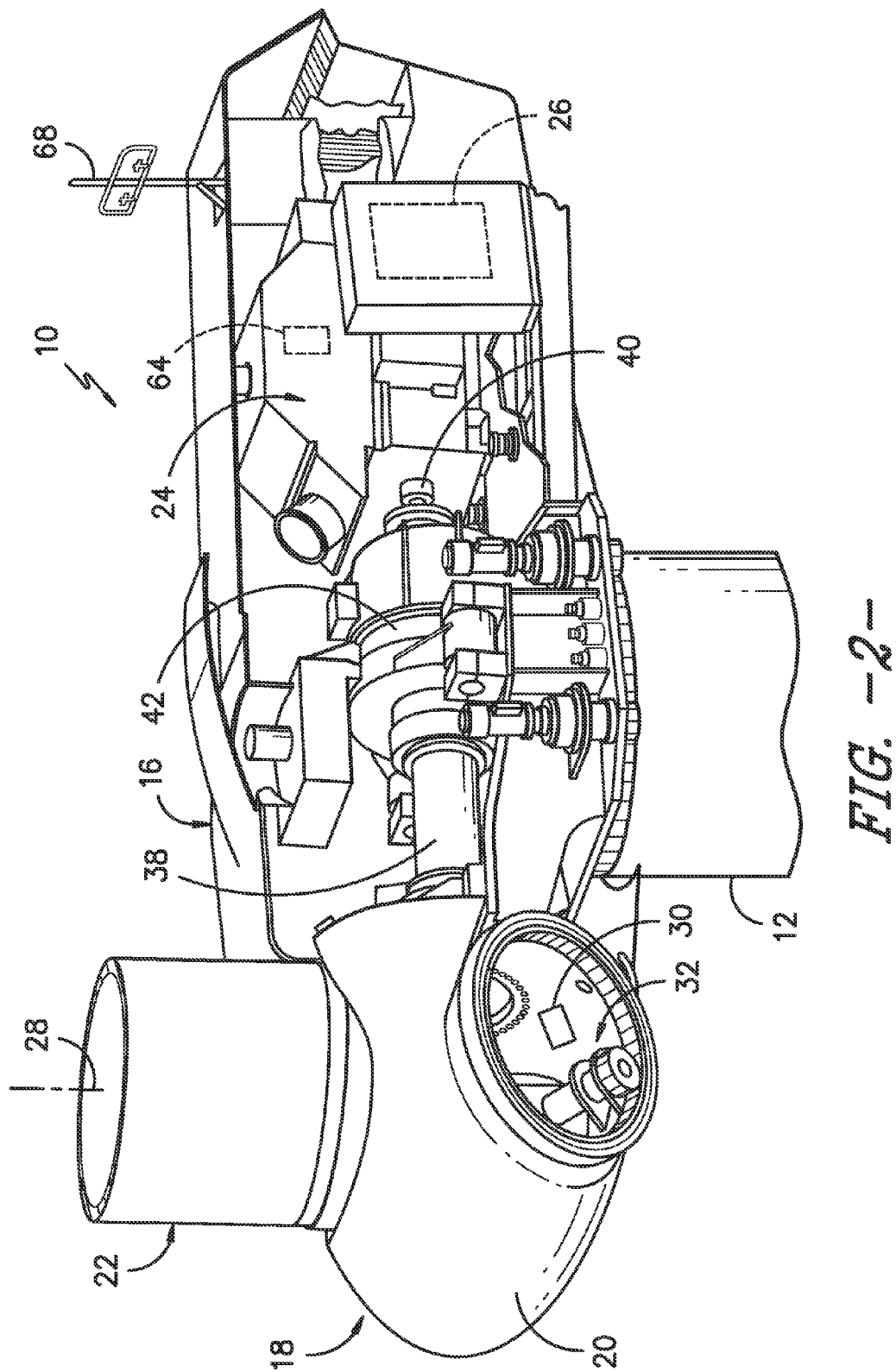
FIG. -2-

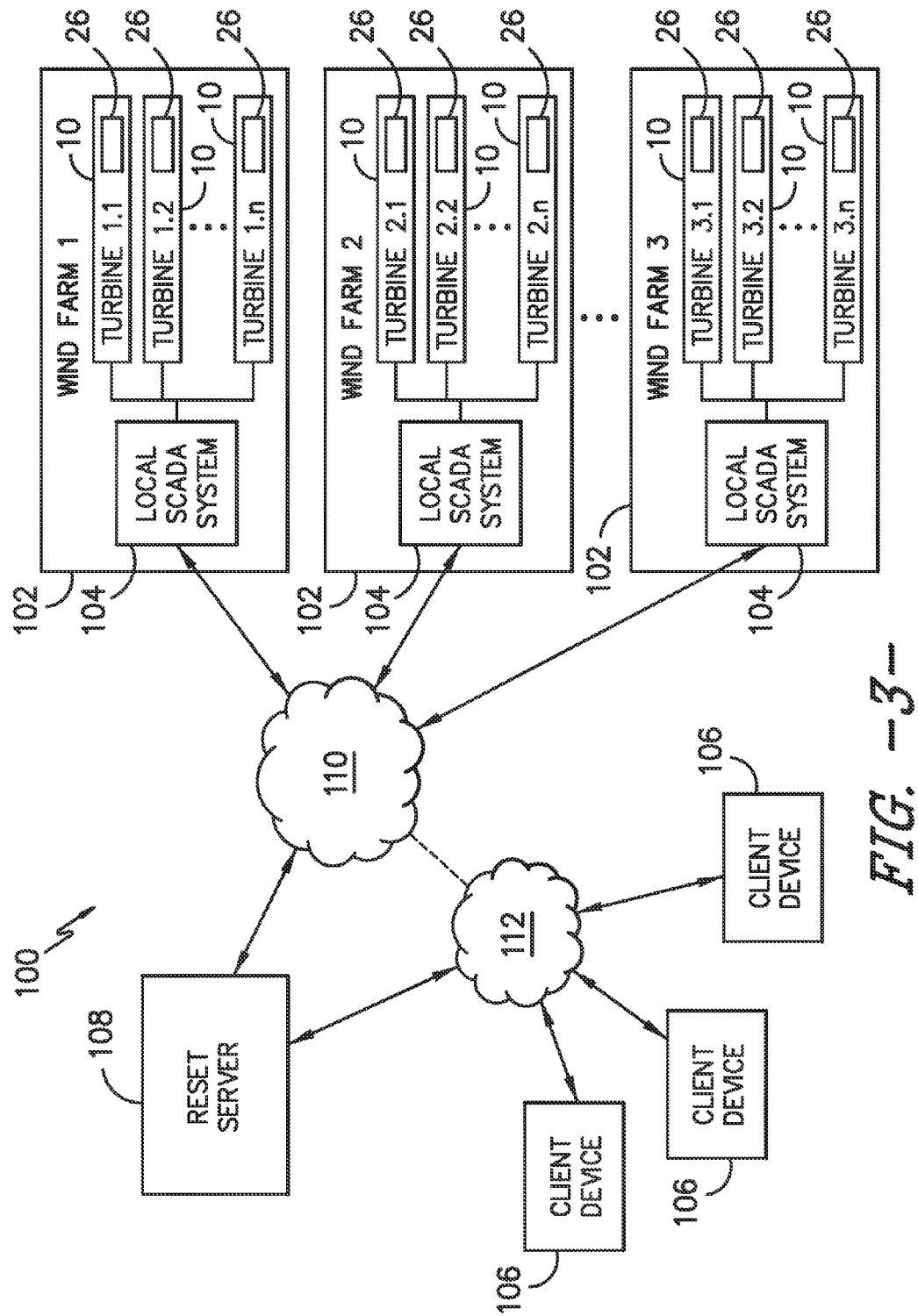
FIG. -3-

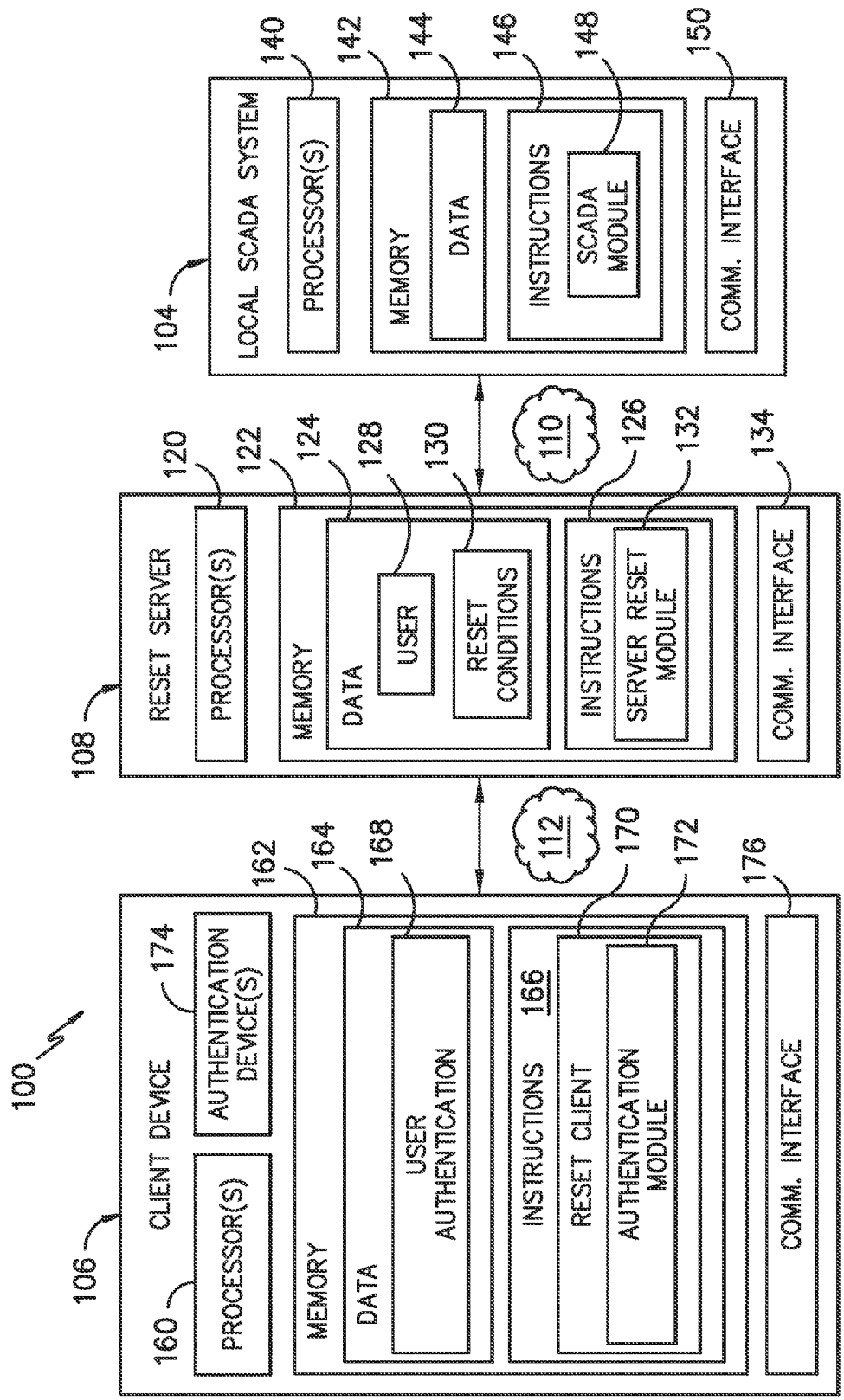
FIG. -4-

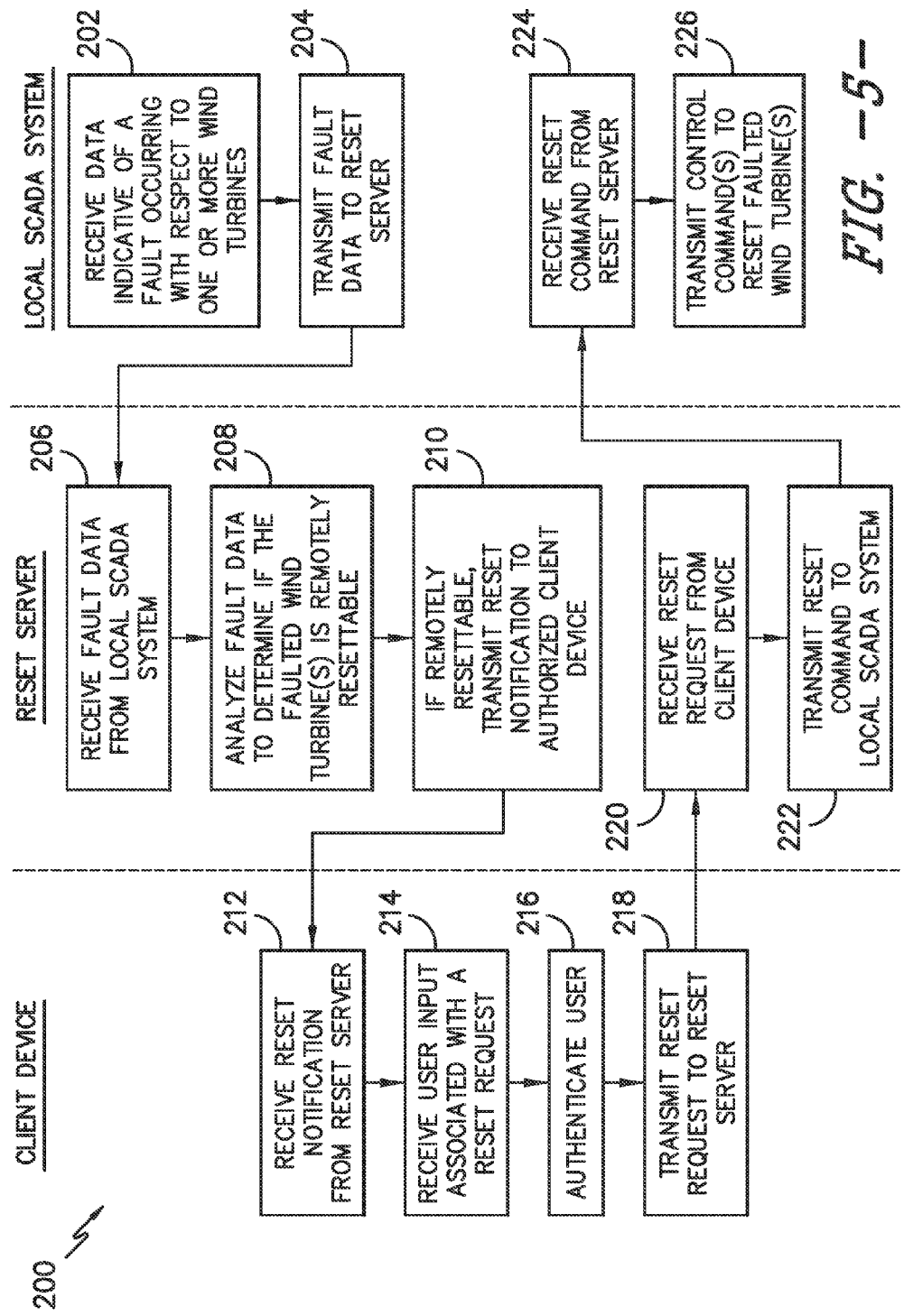
FIG. -5-

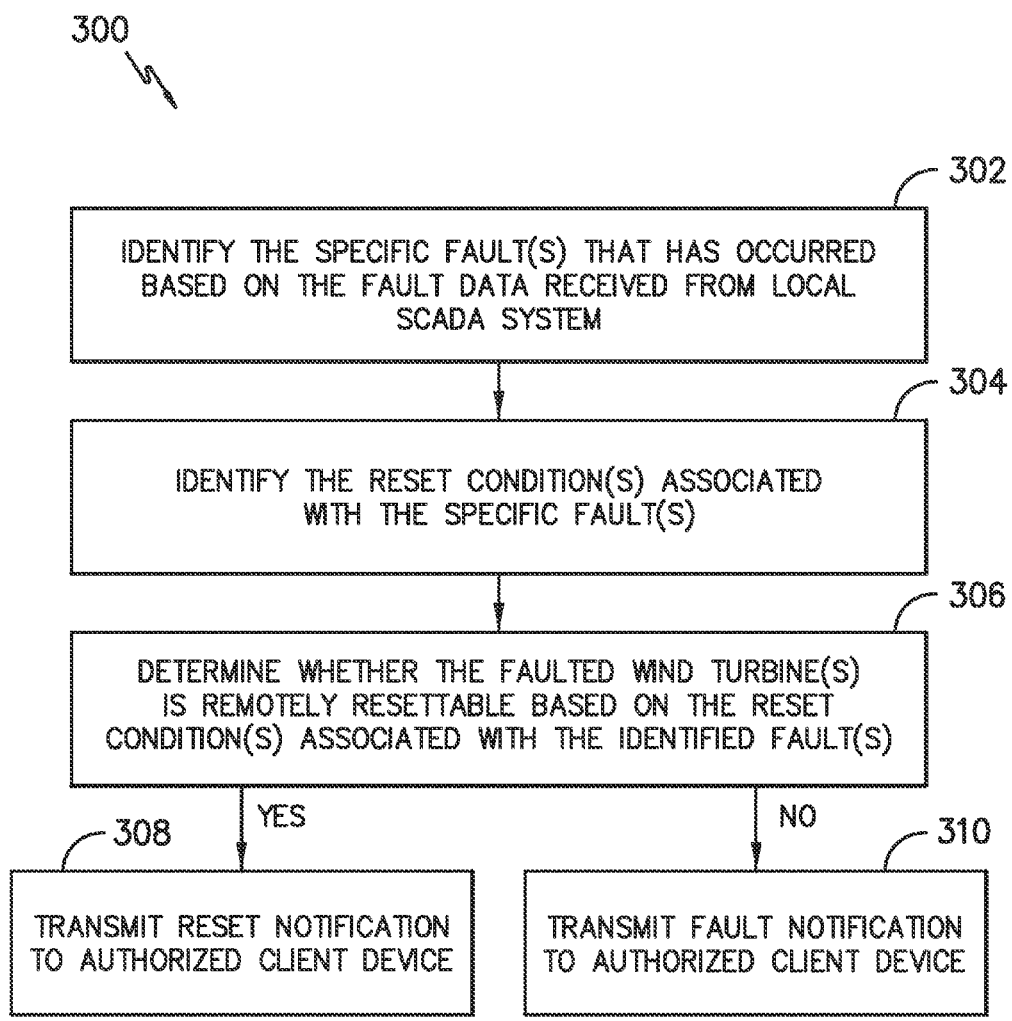
FIG. -6-

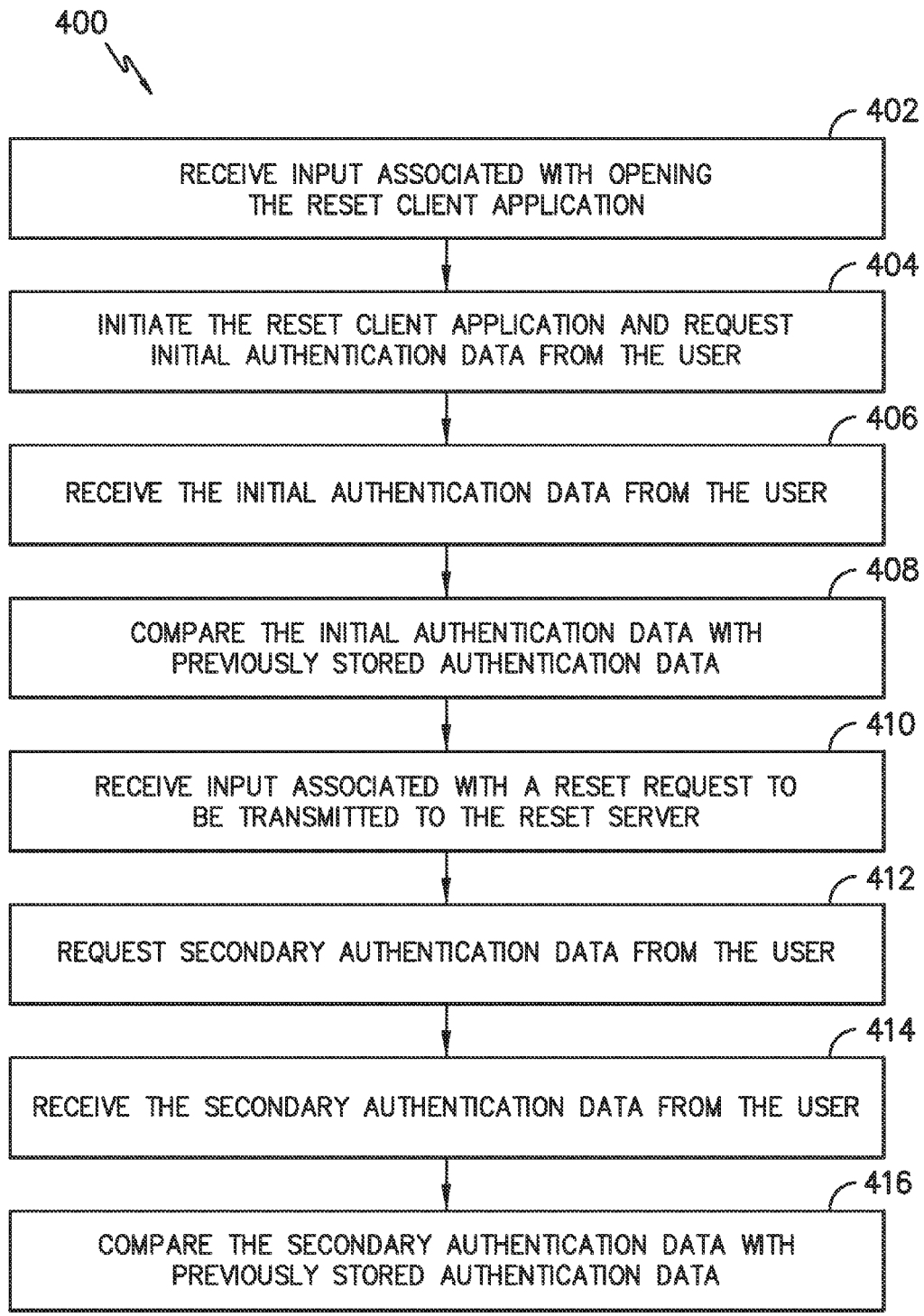
FIG. —7—

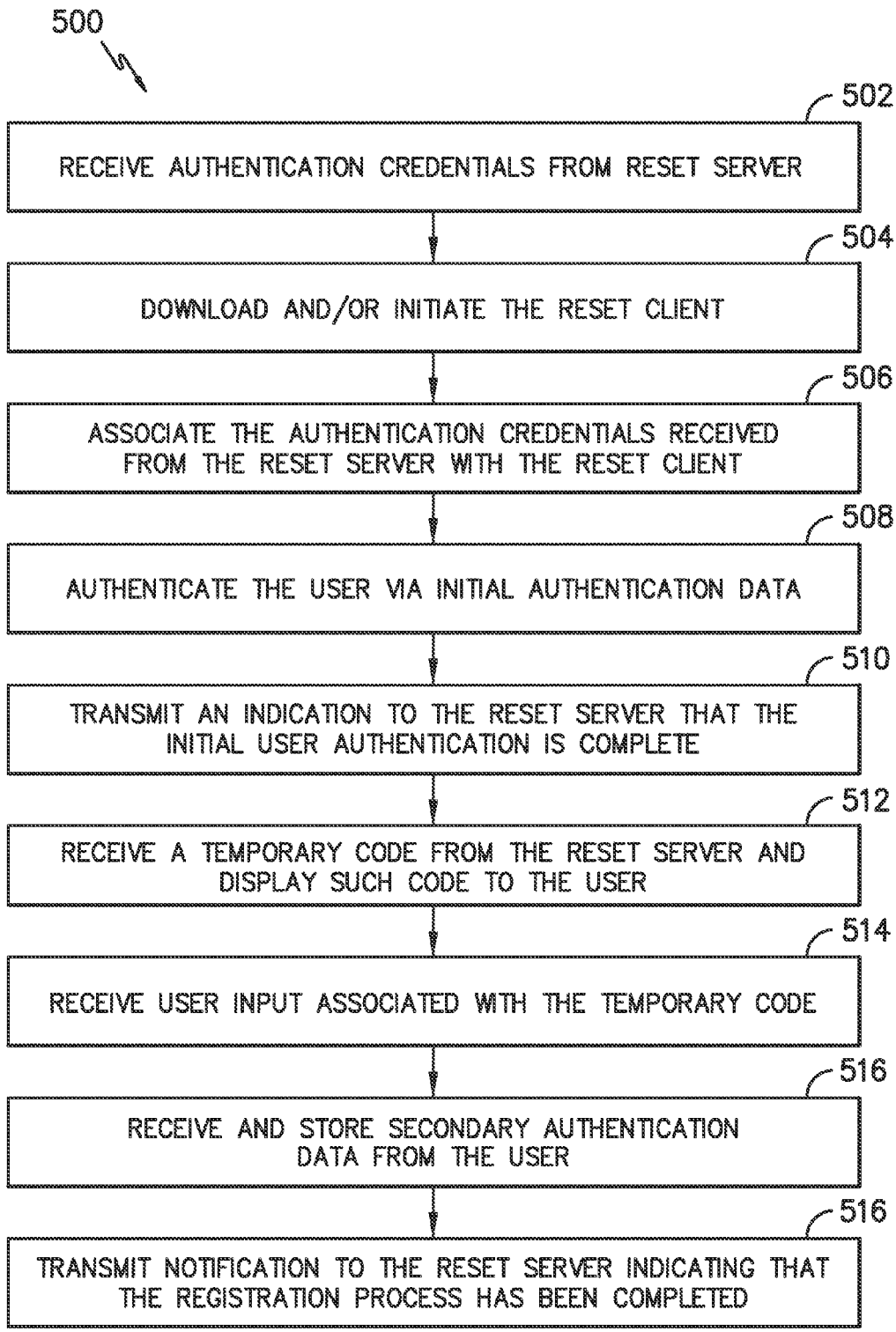
FIG. -8-

SYSTEM AND METHOD FOR REMOTELY RESETTING A FAULTED WIND TURBINE

FIELD OF THE INVENTION

The present subject matter relates generally to wind turbines and, more particularly, to a system and method that allows for a faulted wind turbine to be reset remotely via a suitable client device, such as a smartphone or other mobile device.

BACKGROUND OF THE INVENTION

A wind farm typically consists of a group of interconnected wind turbines disposed at a given farm site. The wind farm may include a group of two wind turbines or a group of hundreds of wind turbines, with the turbines being spread out over a small area (e.g., several hundred square meters) or over an extended area (e.g., hundreds of square kilometers). As is generally understood, the farm site typically corresponds to a location or area that provides the desired amount of wind exposure, which may be an offshore location or an onshore location.

The wind turbines within a wind farm are typically monitored and controlled using a supervisory control and data acquisition (SCADA) system that is housed within a control station located at the wind farm site. For example, the turbine controller housed within each wind turbine may be communicatively coupled to one or more computing devices located within the on-site control station. The control station computing device(s) may then implement the SCADA system by collecting operating data from the turbine controllers and transmitting control signals to the turbine controllers for controlling the operation of their corresponding wind turbines.

When a turbine fault occurs that requires a turbine reset with respect to one or more wind turbines within a wind farm, current control systems require that an operator connect to the on-site SCADA system and manually reset each impacted turbine. Unfortunately, this process is often quite slow, thereby unnecessarily increasing the downtime associated with the faulted wind turbine(s). Moreover, the problems associated with turbine downtime become even more of an issue when an operator is responsible for the operation of multiple wind farms located at a plurality of different locations, given that the operator is required to connect to the local SCADA system associated with each wind farm individually in order to manually reset the faulted wind turbine(s) within each farm. Such separate and individualized control significantly decreases the operator's response time to turbine faults occurring over multiple wind farms.

Accordingly, an improved system and method that allows for wind turbines located within one or more wind farms to be effectively and efficiently reset from a location remote to the wind farm(s) would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a computer-implemented method for remotely resetting faulted wind turbines. The method may generally include receiving fault data associated with a turbine fault that has occurred for a faulted wind turbine, analyzing one or more reset conditions associated with the turbine fault; determining whether the faulted wind turbine is remotely resettable based on the one or more reset conditions associated with the turbine fault and if the turbine fault is remotely resettable, transmitting a reset notification to a client device authorized to receive notifications for the wind turbine, wherein the reset notification indicates that the faulted wind turbine can be remotely reset.

In another aspect, the present subject matter is directed to a computer-implemented method for remotely resetting faulted wind turbines. The method may generally include receiving a notification from a separate computing device indicating that a turbine fault that has occurred with respect to a faulted wind turbine, receiving a user input from a user of the client device that is associated with transmitting a reset request for resetting the faulted wind turbine and requesting authentication data to be provided by the user, wherein the authentication data includes biometric data associated with the user. The method may also include comparing the authentication data provided by the user to predetermined authentication data and, if the authentication data provided by the user matches the predetermined authentication data, transmitting the reset request to the separate computing device.

In a further aspect, the present subject matter is directed to a system for remotely resetting faulted wind turbines. The system may generally include a computing device having one or more processors and associated memory. The memory may store instructions that, when implemented by the processor(s), configure the computing device to receive fault data associated with a turbine fault that has occurred for a faulted wind turbine, analyze one or more reset conditions associated with the turbine fault, determine whether the faulted wind turbine is remotely resettable based on the one or more reset conditions associated with the turbine fault and, if the turbine fault is remotely resettable, transmit a reset notification to a client device authorized to receive notifications for the wind turbine, wherein the reset notification indicates that the faulted wind turbine can be remotely reset.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective, internal view of one embodiment of a nacelle suitable for use with the wind turbine shown in FIG. 1;

FIG. 3 illustrates a simplified view of one embodiment of a system for remotely resetting a faulted wind turbine(s) in accordance with aspects of the present subject matter;

FIG. 4 illustrates a schematic view of various components of the system shown in FIG. 3;

FIG. 5 illustrates a flow diagram of one embodiment of a method for remotely resetting a faulted wind turbine(s) in accordance with aspects of the present subject matter;

FIG. 6 illustrates a flow diagram of one embodiment of a method for analyzing fault data so as to determine whether a faulted wind turbine(s) may be safely reset from a remote location by an authorized user in accordance with aspects of the present subject matter;

FIG. 7 illustrates a flow diagram of one embodiment of a method for authenticating a user that is attempting to remotely reset a faulted wind turbine(s) in accordance with aspects of the present subject matter; and FIG. 8 illustrates a flow diagram of one embodiment of a method for initially registering a user as an authorized user for remotely resetting a faulted wind turbine(s) in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for remotely resetting one or more faulted wind turbine(s). Specifically, in several embodiments, the disclosed system and method may allow for an authorized user to remotely reset a faulted wind turbine using his/her smartphone or other client device. For example, as will be described below, the local supervisory control and data acquisition (SCADA) system installed at each wind farm may be configured to detect when a fault(s) occurs with respect to one or more wind turbines contained within the farm and transmit corresponding fault data to a reset server of the disclosed system. The reset server may then be configured to analyze the fault data associated with the specific fault(s) that has occurred to determine if the faulted wind turbine(s) is remotely resettable. If it is determined that the faulted wind turbine(s) is remotely resettable, the reset server may transmit a suitable notification to the client device of the user(s) authorized to reset such turbine(s) indicating that one or more faults have occurred and that the impacted turbine(s) needs to be reset. If desired, the user may then transmit a reset request back to the reset server (e.g., via his/her client device) for resetting the faulted wind turbine(s). Upon receipt of the reset request, the reset server may then transmit a reset command to the local SCADA system instructing the SCADA system to reset the faulted wind turbine(s).

Additionally, in several embodiments, the present subject matter is also directed to various systems and/or methods for initially registering a user as an authorized user for remotely resetting one or more faulted wind turbine(s) and/or for subsequently authenticating a user when he/she actually desires to remotely reset a faulted wind turbine(s). For example, as will be described below, the user may be required to provide various types of authentication data, such as a username/password and/or biometric data (e.g., fingerprint data, retinal data, facial feature data), in order to authenticate himself/herself as an authorized user. In addition, the user may be required to perform a token-based exchange with the reset server. For instance, the reset server may be configured to transmit a temporary code (e.g., a six digit number) to the user's client device that expires within a short period of time (e.g., five minutes). The user may then be required to input the code into his/her device prior to its expiration to provide an added layer of user authentication to the process.

Referring now to the drawings, FIG. 1 illustrates a perspective view of one embodiment of a wind turbine 10 in accordance with aspects of the present subject matter. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16 (or disposed at any other suitable location within and/or relative to the wind turbine 10). In general, the turbine controller 26 may comprise a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the turbine controller 26 may control the pitch angle of the rotor blades 22, either individually or simultaneously, by transmitting suitable control signals to one or more pitch drives or pitch adjustment mechanisms 32 (FIG. 2) of the wind turbine 10.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 38 coupled to the hub 20 for rotation therewith. The rotor shaft 38 may, in turn, be rotatably coupled to a generator shaft 40 of the generator 24 through a gearbox 42. As is generally understood, the rotor shaft 38 may provide a low speed, high torque input to the gearbox 42 in response to rotation of the rotor blades 22 and the hub 20. The gearbox 42 may then be configured to convert the low speed, high torque input to a high speed, low torque output to drive the generator shaft 40 and, thus, the generator 24.

Additionally, as indicated above, the turbine controller 26 may also be located within the nacelle 16 (e.g., within a control box or panel). However, in other embodiments, the turbine controller 26 may be located within any other component of the wind turbine 10 or at a location outside the wind turbine. As is generally understood, the turbine controller 26 may be communicatively coupled to any number of the components of the wind turbine 10 in order to control the operation of such components. For example, as indicated above, the turbine controller 26 may be communicatively coupled to each pitch adjustment mechanism 32 of the wind turbine 10 (one for each rotor blade 22) via a pitch controller 30 to facilitate rotation of each rotor blade 22 about its pitch axis 28.

In addition, the turbine controller 26 may also be communicatively coupled to one or more sensors for monitoring various operating parameters of the wind turbine 10. For example, in several embodiments, the wind turbine 10 may include one or more generator sensors 64 configured to monitor one or more generator-related operating parameters of the wind turbine 10, such as the power output of the generator 24, the rotational speed of the generator 24, the generator torque, the temperature of the generator 24 and/or the like. Similarly, the turbine controller 26 may be communicatively coupled to one or more wind sensors 68 for monitoring one or more wind conditions of the wind turbine 10, such as the wind speed, the wind direction, the turbulence or turbulence intensity of the wind and/or the like.

Of course, the wind turbine 10 may further include various other suitable sensors for monitoring any other suitable operating parameters of the wind turbine 10. For instance, the wind turbine 10 may include one or more load sensors (not shown) for monitoring the loads acting on one or more of the wind turbine components (e.g., the loads acting on the blades 22, the hub 22 and/or the tower 12), one or more shaft sensors (not shown) configured to monitor one or more shaft-related operating parameters of the wind turbine 10 (e.g., the deflection or the rotational speed of the rotor shaft 38), one or more electrical parameter sensors (not shown) configured to monitor one or more electrical parameters associated with the wind turbine 10 and/or the like. It should be appreciated that the various sensors described herein may correspond to pre-existing sensors of a wind turbine 10 and/or sensors that have been specifically installed within the wind turbine 10 to allow one or more operating parameters to be monitored.

It should also be appreciated that, as used herein, the term "monitor" and variations thereof indicates that the various sensors of the wind turbine 10 may be configured to provide a direct or indirect measurement of the operating parameters being monitored. Thus, the sensors may, for example, be used to generate signals relating to the operating parameter being monitored, which can then be utilized by the turbine controller 26 (or any other suitable controller or computing device) to determine the actual operating parameter.

Referring now to FIG. 3, one embodiment of a system 100 for remotely resetting a faulted wind turbine 10 is illustrated in accordance with aspects of the present subject matter. In general, the system 100 may include one or more wind farms 102 (e.g., wind farms 1, 2, . . . m), with each wind farm 102 containing a plurality of wind turbines 10 (e.g., wind turbines 1, 2, . . . n). Each wind turbine 10 contained within one of the wind farms 102 may generally be configured the same as or similar to the wind turbine 10 described above with reference to FIGS. 1 and 2. For example, each wind turbine 10 may include a tower extending from a support surface, a nacelle mounted on the tower and a rotor coupled to the nacelle, with the rotor comprising a rotatable hub and one or more rotor blades. Additionally, as shown in FIG. 3, each wind turbine 10 may also include a turbine controller 26 configured to receive, transmit and/or execute control commands for controlling the operation of its respective wind turbine 10.

Moreover, as shown in FIG. 3, each wind farm 102 may include a local supervisory control and data acquisition (SCADA) system 104 communicatively coupled to each wind turbine 10 located within the wind farm 102. As is generally understood, each SCADA system 104 may serve as the "nerve center" for its respective wind farm 102. Specifically, each local SCADA system 104 may be configured to dynamically monitor and/or control the operation of the various wind turbines 10 located within the wind farm 102. For example, each local SCADA system 104 may be configured to transmit suitable control commands for resetting the wind turbines 10 contained within the wind farm 102 when any of such turbines 10 are down due to the occurrence of a give turbine fault(s). As will be described below, in several embodiments, such control commands may be transmitted in response to a reset request originating from a client device 106 authorized to reset the wind turbine(s) 10 contained within the wind farm 102.

Additionally, as shown in FIG. 3, the system 100 may also include a turbine reset server 108 configured to provide a communication interface between each local SCADA system 104 and one or more authorized client devices 106. In general, the reset server 108 may allow for a user of an authorized client device 106 to receive a fault-related notification(s) associated with one or more faulted wind turbines 10 and, based on such notification(s), transmit a suitable request(s) for resetting the faulted wind turbine(s) 10. For example, as will be described below, the reset server 108 may be configured to receive fault data from each local SCADA system 104 indicating the occurrence of a fault(s) associated with one or more of its controlled wind turbines 10 and, based on such fault data, transmit a notification to an authorized client device(s) 106 notifying the user(s) of such device(s) 106 of the occurrence of the fault(s) and that the impacted wind turbine(s) need to be reset. In addition, the reset server 108 may be configured to receive a user-initiated reset request from the authorized client device(s) 106 associated with resetting the faulted wind turbine(s). Thereafter, the reset server 108 may be configured to transmit a reset command to the local SCADA system(s) 104 that instructs the SCADA system(s) 104 to reset the faulted wind turbine(s) based on the user-initiated reset request.

As shown in FIG. 3, communications between the various components of the system 100 may be provided across one or more networks 110, 112. For example, in one embodiment, communications between the reset server 108 and the various local SCADA systems 104 may be provided across network 110 while communications between the reset server 108 and the various authorized client devices 106 may be provided across network 112. In general, the networks 110, 112 may correspond to any suitable wired or wireless network(s) that allows the various system components to communicate with one another via any suitable communications protocol (e.g. TCP/IP, HTTP, SMTP, FTP) and/or using any suitable encodings/formats (e.g. HTML, XML) and/or protection schemes (e.g. VPN, secure HTTP, SSL).

It should be appreciated that, although the networks 110, 112 are shown separately in FIG. 3, the networks 110, 112 may form part of or extend across the same overall network, with each individual network 110, 112 simply providing communications via a different communications protocol and/or a different protection scheme. For example, in one embodiment, network 110 may correspond to an encrypted virtual private network (VPN) provided across a suitable wide-area network (WAN), such as the internet. Similarly, in one embodiment, network 112 may correspond to an encrypted network via a secure HTTP provided across a suitable WAN, such as the internet.

Referring now to FIG. 4, a schematic view of various components of the system 100 shown in FIG. 3 is illustrated in accordance with aspects of the present subject matter. As shown, the system 100 may include a client-server architecture, with the turbine reset server 108 being configured to communicate with each authorized client device(s) 106 and/or each local SCADA system(s) 104 over the network(s) 110, 112. In general, the reset server 108 may correspond to any suitable computing device and/or any suitable combination of computing devices. Similarly, each client device 106 may generally correspond to any suitable computing device and/or combination of computing devices, such as any suitable display(s) having one or more processors coupled thereto and/or embedded therein. However, in a particular embodiment, each client device 106 may correspond to a mobile device, such as a smartphone, a tablet, a wearable computing device(s) and/or any other suitable portable device(s). Additionally, each local SCADA system 104 may also generally correspond to and/or include any suitable computing device and/or combination of computing devices.

As shown in FIG. 4, the reset server 108 may generally include one or more processor(s) 120 and associated memory 122 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 122 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 122 may generally be configured to store information accessible to the processor(s) 120, including data 124 that can be retrieved, manipulated, created and/or stored by the processor(s) 120 and instructions 126 that can be executed by the processor(s) 120.

In several embodiments, the data 124 may be stored in one or more databases. For example, the memory 122 may include a user database 128 including data associated with the various users authorized to receive notifications and/or transmit reset requests in association with one or more faulted wind turbines 10. Specifically, in one embodiment, the user database 128 may store data that associates each authorized user with one or more wind turbines 10 contained within a single wind farm 102 or across multiple wind farms 102. For example, a user may be authorized to receive reset notifications associated with all of the wind turbines 10 contained within a single wind farm 102 or all of the wind turbines 10 contained within two or more wind farms 102. Alternatively, the user may only be authorized to receive reset notifications associated with one or more specific wind turbines 10 within a given wind farm 102 and/or one or more specific wind turbines dispersed throughout two or more wind farms 102.

It should also be appreciated that, in one embodiment, the user database 128 may also include authentication data associated with each authorized user. As will be described below, authentication data may generally correspond to any suitable credentials and/or other data that provides a means for authenticating or otherwise verifying the identity of a user.

As shown in FIG. 4, the memory 122 may also include a reset condition database 130 that stores data associated with a plurality of reset conditions that may be used to assess whether a faulted wind turbine 10 should be allowed to be remotely reset by an authorized user. For example, in several embodiments, the reset conditions stored within the database 130 may be associated with predetermined fault handling guidelines or rules for determining whether a wind turbine 10 may be remotely reset based on the specific fault(s) that has occurred. For instance, as will be described below, one or more reset conditions may be defined for each turbine fault capable of being experienced by a wind turbine 10 so as to allow the reset server 108 to automatically determine whether a faulted wind turbine 10 is remotely resettable. For example, the reset condition(s) may define whether the wind turbine 10 is remotely resettable after the first occurrence of a given fault or after multiple occurrences of such fault and/or whether the wind turbine 10 is remotely resettable when such fault occurs in combination with one or more other faults.

Additionally, in several embodiments, the instructions 126 stored within the memory 122 of the reset server 108 may be executed by the processor(s) 120 to implement a server reset module 132. In general, the server reset module 132 may provide a means for transmitting data, requests, and/or commands between each SCADA system 104 and the reset server 108 and/or between the reset server 108 and each authorized client device 106. For example, in several embodiments, the server reset module 132 may be configured to receive fault data from one or more of the local SCADA systems 104 indicating that a fault has occurred with respect to a given wind turbine(s) 10 and analyze such fault data (e.g., based on the reset condition(s) stored in the database 130) to determine whether the faulted wind turbine(s) may be remotely reset by an authorized user. If so, the server reset module 132 may be configured to transmit a reset notification to the client device 106 of the authorized user notifying the user that the fault has occurred and that the turbine(s) 10 needs to be reset. Moreover, if the user responds by transmitting a reset request back to the reset server 108, the server reset module 132 may be configured to transmit a suitable reset command to the associated local SCADA system(s) 104 instructing the SCADA system 104 to reset the faulted wind turbine(s) 10.

As shown in FIG. 4, the reset server 108 may also include a network or communications interface 134 to provide a means for the server 108 to communicate with each client device 106 and/or each local SCADA system 104 over the network(s) 110, 112. In general, the communications interface 132 may correspond to any suitable device/medium that allows the server 108 to interface with the network(s) 110, 112 and/or any other suitable network.

Additionally, similar to the reset server 108, each local SCADA system 104 may also include one or more processor(s) 140 and associated memory 142. Such memory 142 may generally be configured to store information accessible to the processor(s) 140, including data 144 that can be retrieved, manipulated, created and/or stored by the processor(s) 140 and instructions 146 that can be executed by the processor(s) 140. For example, in several embodiments, the data 144 may be stored in one or more databases, such as a performance database (not shown) storing information relating to one or more operating parameters of the wind turbines 10 contained within the associated wind farm 102.

Moreover, in several embodiments, the instructions 146 stored within the memory 142 of each SCADA system 104 may be executed by the processor(s) 140 to implement a local SCADA module 148. In general, the SCADA module 148 may be configured to allow the SCADA system 104 to serve as a data acquisition unit for collecting and/or monitoring the operating parameters of every wind turbine 10 contained within its associated wind farm 102. In addition, the SCADA module 148 may allow each SCADA system 104 to dynamically control the operation of every wind turbine 10 within its associated wind farm 102. Such control may include, for example, resetting a given wind turbine(s) 10 upon receipt of a reset command(s) from the reset server 108.

Moreover, each SCADA system 104 may also include a network or communications interface 150 for providing communications over the network(s) 110 (and/or any other suitable network) to the reset server 108 and/or for providing communications to each associated wind turbine 10 (e.g., via a local wind farm network (not shown)). Similar to the interface 134 provided for the reset server 108, the communications interface 150 may generally be any device/medium that allows each SCADA system 104 to interface with the reset server 108 and/or its associated wind turbines 10.

Referring still to FIG. 4, as indicated above, each client device 106 may generally correspond to any suitable computing device(s). Thus, as shown in FIG. 4, the client device 106 may include one or more processor(s) 160 and associated memory 162. Such memory 162 may generally be configured to store information accessible to the processor(s) 160, including data 164 that can be retrieved, manipulated, created and/or stored by the processor(s) 160 and instructions 166 that can be executed by the processor(s) 160.

In several embodiments, the data 164 may be stored in one or more databases. For example, as shown in FIG. 4, in one embodiment, the memory 162 may include an authentication database 168 storing authentication data associated with the user(s) of the client device 106. As indicated above, authentication data may generally correspond to credentials and/or other data that provides a means for authenticating or otherwise verifying the identity of the user of the client device 106. For instance, the authentication data may include a username and password associated with the user(s) and/or any other similar data typically utilized to authenticate the user of a given client device 106. As will be described below, in several embodiments, the authentication data may also include biometric information associated with the user of the client device 106 (e.g., fingerprint data, retinal scan data, facial feature data and/or the like).

Additionally, the instructions 166 stored within the memory 162 of each client device 106 may be executed by the processor(s) 160 to implement a reset client application 170 designed to allow the user of the client device 106 to interface with the reset server 108. Specifically, in several embodiments, the reset client application 170 may be configured to present a user interface that allows the user to both view notifications transmitted from the reset server 108 and transmit reset requests back to the reset server 108. For instance, upon receipt of a reset notification from the reset server 108, the reset client application 170 implemented on the client device 106 may be configured to display the notification to the user along with a selectable user interface element (e.g., a button displayed on the screen) that allows user to provide an input associated with his/her desire to reset the faulted wind turbine(s) 10 associated with the reset notification. Upon receipt of the user input (and assuming the user has been properly authenticated), the reset client application 170 may then transmit a suitable reset request to the reset server 108 instructing the server 108 to command that the faulted wind turbine(s) be reset by the associated local SCADA system(s) 104.

Moreover, as shown in FIG. 4, in several embodiments, the instructions 166 stored within the memory 162 may be executed by the processor(s) 160 to implement an authentication module 172 associated with the reset client application 170. In general, the authentication module 172 may be configured to implement one or more authentication/registration routines for authenticating/registering the user of the client device 106. For instance, the authentication module 172 may require that the user input one or more types of authentication data into the client device 106 (e.g., username/password, fingerprint data, retinal data, temporary password, etc.). The authentication data provided by the user may then be compared to the corresponding data stored within the authentication database 168. If the authentication data provided by the user matches the authentication data stored within the database 168, the authentication module 172 may be configured to provide an indication to the reset client application 170 that the user has been properly authenticated.

As shown in FIG. 4, the client device 106 may also include one or more authentication device(s) 174. In general, the authentication device(s) 174 may correspond to any suitable input device(s) and/or other device(s) that allows a user to input or transmit authentication data to the client device 106. For example, if the required authentication data corresponds to alphanumeric data, such as a username/password, the authentication device(s) 174 may correspond to the input device associated with the client device 106 for providing such data (e.g., a touch screen or a physical keyboard of the device 106). Similarly, if the required authentication data corresponds to fingerprint data, the authentication device(s) 174 may correspond to a fingerprint scanner and/or any other suitable input device that allows for fingerprint data of a user to be captured and/or input into the client device 106. Additionally, if the required authentication data is image-based data (e.g., images of the user's eyes to be used as retinal scan data and/or images of the user's face to be used as facial recognition data), the authentication device(s) 174 may correspond to a camera and/or any other suitable image capture device that allows for such data to be input into the client device 106.

Additionally, as shown in FIG. 4, the client device 106 may also include a network or communications interface 176 for providing communications over the network 112 (and/or any other suitable network). Similar to the interfaces 134, 150 described above, the communications interface 176 may generally be any device/medium that allows the client device 106 to interface with the reset server 108 and/or any other suitable device.

It should be appreciated that, as used herein, the term "module" refers to computer logic utilized to provide desired functionality. Thus, a module may be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

Referring now to FIG. 5, a flow diagram of one embodiment of a method 200 for remotely resetting a faulted wind turbine(s) is illustrated in accordance with aspects of the present subject matter. In general, the method 200 will be described herein with reference to the system 100 described above with reference to FIGS. 2 and 3. However, it should be appreciated by those of ordinary skill in the art that the disclosed method 200 may be implemented within any other system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the local SCADA system 104 may be configured to receive data indicative of a fault occurring with respect to one or more wind turbines 10 within a wind farm 102. For example, as indicated above, each local SCADA system 104 may be communicatively coupled to the turbine controller 26 of each wind turbine 10 located within its associated wind farm 102. As a result, when a fault(s) occurs, the turbine controller(s) 26 associated with the faulted wind turbine(s) 10 may be configured to transmit fault data to the SCADA system 104 including information related to the type of fault(s) that occurred and/or information related to one or more operating parameters associated with the fault(s).

Additionally, at (204), the fault data may be transmitted from the local SCADA system 104 to the reset server 108 (e.g., over network 110). Thereafter, at (206), the fault data transmitted from the local SCADA system 104 may be received by the reset server 108. As shown in FIG. 5, the reset server 108 may then, at (208) be configured to analyze the fault data to determine if the faulted wind turbine(s) should be allowed to be remotely reset by an authorized user associated with such turbine(s). Such an analysis may, for example, be performed using the method 300 shown in FIG. 6.

Specifically, FIG. 6 illustrates a flow diagram of one embodiment of a method 300 for analyzing fault data received from a local SCADA system 104 so as to determine whether a faulted wind turbine(s) may be safely reset from a remote location by an authorized user. As shown in FIG. 6, at (302), the method 300 includes identifying the specific fault(s) that has occurred based on the fault data provided by the local SCADA system 104. For example, as indicated above, the fault data may expressly include information associated with the specific type of fault(s) that has occurred. In such instance, the reset server 108 may identify the specific fault(s) by simply accessing the fault data transmitted by the local SCADA system 104. Alternatively, the fault data may only correspond to performance and/or operational data providing an indication that a given fault(s) has occurred. In such an embodiment, the reset server 108 may be configured to determine which fault(s) has occurred based on analysis of the performance and/or operational data received from the local SCADA system 104.

Additionally, at (304), the method 300 includes identifying the reset condition(s) associated with the specific fault(s) determined to have occurred based on the received fault data. Specifically, as indicated above, the reset server 108 may, in several embodiments, include a reset condition database 130 storing one or more reset conditions associated with each unique type of fault that may occur during operation of a wind turbine 10. In such embodiments, the reset server may be configured to access the database 130 to identify the reset condition(s) associated with the specific fault(s) determined at (302).

It should be appreciated that the reset condition(s) associated with each specific type of fault may generally be determined based on field testing, historical data, empirical data, manufacturer's guidelines, component modeling and/or any other suitable data source and/or other information that may be relevant in determining whether a wind turbine that has experienced a specific fault should be allowed to be remotely reset by an authorized user. Additionally, it should be appreciated that the reset condition(s) may vary from fault-to-fault and from turbine-to-turbine. For example, the reset condition(s) associated with a given fault may vary depending on the specific configuration for a wind turbine 10 (e.g., a 1.5 MW wind turbine as opposed to a 2.5 MW wind turbine) and/or the specific components included within a wind turbine 10. Moreover, the reset condition(s) associated with a given fault may also vary depending on the operating environment of a wind turbine.

In addition, it should be appreciated that each reset condition may be associated with one or more guidelines or rules indicating whether a faulted wind turbine 10 may be allowed to be remotely reset when such reset condition is satisfied. For example, in one embodiment, each reset condition may be identified as a remotely resettable condition or a non-remotely resettable condition. In such an embodiment, if the fault data indicates that only a remotely resettable condition(s) associated with the identified fault(s) has been satisfied, it may be determined that the faulted wind turbine(s) 10 may be remotely reset by an authorized user. Alternatively, if the fault data indicates that a non-remotely resettable condition associated with the identified fault(s) has been satisfied, it may be determined that the faulted wind turbine(s) 10 may not be remotely reset by an authorized user. In addition to identifying each reset condition as a remotely resettable condition or a non-remotely resettable condition, the guidelines or rules associated with each reset condition may also specify instances or exceptions in which a remotely resettable condition may be treated as a non-remotely resettable condition and vice versa. For example, a remotely resettable condition may be identified as a non-remotely resettable condition if the specific reset condition has been satisfied more than a predetermined number of times within a specified time period or if the reset condition occurs in combination with another reset condition.

As one example, multiple reset conditions may be associated with a turbine fault occurring due to excessive temperatures related to the generator 24 of a wind turbine 10. For instance, a first reset condition may be associated with the turbine fault that indicates that the faulted wind turbine(s) 10 may be remotely reset if the generator temperature that resulted in the fault falls within a temperature range defined between a first temperature threshold and a second temperature threshold. Similarly, a second reset condition may be associated with the turbine fault that indicates that the faulted wind turbine(s) may not be remotely reset if the generator temperature that resulted in the fault exceeds the second temperature threshold. Additionally, a third reset condition may be associated with the turbine fault that indicates that the faulted wind turbine(s) 10 may not be remotely reset if the first reset condition has been satisfied more than a predetermined number of times (e.g., two or more times) within a given time period (e.g., within a span of two or more weeks).

As another example, multiple reset conditions may be associated with a turbine fault occurring due to vibrations related to the tower 12 of a wind turbine 10. For instance, a first reset condition may be associated with the turbine fault that indicates that the faulted wind turbine(s) 10 may be remotely reset if the tower vibrations that resulted in the fault were less than a predetermined vibration threshold for the wind turbine 10. Similarly, a second reset condition may be associated with the turbine fault that indicates that the faulted wind turbine(s) may not be remotely reset if the tower vibrations that resulted in the fault exceeded the vibration threshold. Additionally, a third reset condition may be associated with the turbine fault that indicates that the faulted wind turbine(s) 10 may not be remotely reset if the first reset condition has been satisfied more than a predetermined number of times (e.g., two or more times) within a given time period (e.g., within a span of two or more weeks).

As yet another example, multiple reset conditions may be associated with one or more of the pitch-related turbine faults for a wind turbine 10, such as temperature-related faults for the pitch motor and/or the pitch bearing of the wind turbine's pitch system. For instance, a first reset condition may be associated with the turbine fault that indicates that the faulted wind turbine(s) 10 may be remotely reset if the pitch system temperature that resulted in the fault falls within a temperature range defined between a first temperature threshold and a second temperature threshold. Similarly, a second reset condition may be associated with the turbine fault that indicates that the faulted wind turbine(s) may not be remotely reset if the pitch system temperature that resulted in the fault exceeds the second temperature threshold. Additionally, a third reset condition may be associated with the turbine fault that indicates that the faulted wind turbine(s) 10 may not be remotely reset if the first reset condition has been satisfied more than a predetermined number of times (e.g., two or more times) within a given time period (e.g., within a span of two or more weeks).

It should be appreciated that the reset condition(s) associated with each fault may also be based on or defined as a function of statistical or historical information corresponding to one or more operating parameters associated with the fault. For example, a given reset condition defined for a turbine fault associated with a particular operating parameter (e.g., generator temperature) may be based on statistical information for such operating parameter deriving from other wind turbines located within the same wind turbine farm. In such instance, the reset condition may indicate, for example, that the faulted wind turbine(s) is not remotely resettable if the delta associated with the monitored parameter for the faulted turbine(s) exceeds predetermined variance threshold defined for the operating parameter.

Moreover, in several embodiments, machine learning techniques may be utilized to adjust current reset conditions and/or to develop new reset conditions. For instance, a library of successful reset conditions may be developed over time. Using machine learning techniques, the library may be adjusted and/or increased over time by analyzing the broad spectrum of data associated with successful turbine resets versus resets that may have resulted in the same turbine fault again tripping the wind turbine within a predetermined amount of time.

As shown in FIG. 6, at (306), the method 300 may also include determining whether the faulted wind turbine(s) 10 is remotely resettable based on the reset condition(s) associated with the identified fault(s). Specifically, as indicated above, each reset condition may be associated with one or more guidelines or rules indicating whether a faulted wind turbine(s) 10 is remotely resettable when the reset condition is satisfied. If the faulted wind turbine(s) is remotely resettable, the method 300 may, at (308), include transmitting a reset notification to the client device(s) 106 associated with a user(s) authorized to remotely reset the wind turbine(s) 10. The reset notification may generally correspond to a notification providing information associated with the fault(s) that has occurred (e.g., information related to the specific type of fault(s) and the number and location of the impacted wind turbines 10) and indicating that such fault(s) may be remotely reset by the authorized user. Alternatively, if the faulted wind turbine(s) 10 is not remotely resettable, the method 300 may include, at (310), transmitting a fault notification to the client device(s) 106 associated with the authorized user(s). The fault notification may generally correspond to a notification providing information associated with the fault(s) that has occurred (e.g., information related to the specific type of fault(s) and the number and location of the impacted wind turbines 10). In addition, the fault notification may provide an indication that the specified fault(s) is not remotely resettable and/or may provide additional information associated with what steps must be taken to reset the wind turbine(s) 10.

Referring back to FIG. 5, as indicated above, if it is determined that the faulted wind turbine(s) 10 is remotely resettable, the method 200 includes, at (210), transmitting a suitable reset notification from the reset server 108 to the authorized client device(s) 108 so as to notify the user both of the occurrence of the fault and that such fault is remotely resettable. Thereafter, at (212), the method 200 includes receiving the reset notification transmitted from the reset server 108 at the client device(s) 106.

Additionally, as shown in FIG. 5, at (214), the method 200 includes receiving a user input associated with transmitting a reset request back to the reset server 108. For example, as indicated above, the reset client application 170 implemented on the client device 106 may be configured to present a suitable user interface providing a means for displaying notifications to the user and/or for transmitting user inputs to the reset server 108. Specifically, in one embodiment, the user interface may provide a suitable interface element that allows the user to instruct his/her device 108 to transmit a request for resetting the faulted wind turbine(s) 10. For example, a "reset" button may be presented within the user interface that, when clicked or otherwise selected by the user, initiates a suitable process within the client device 106 for transmitting a reset request back to the reset server 108. Thus, in such an embodiment, the user of the client device 106 may review data/information associated with the reset notification and, if desired, select the "reset" button or otherwise provide a suitable user input indicating his/her desire to reset the faulted wind turbine(s) 10.

Moreover, as shown in FIG. 5, at (216), the method 200 includes authenticating the current user of the client device 106. It should be appreciated that such authentication may occur at any point during the process described herein. For instance, in the illustrated embodiment, the user authentication is shown as occurring after the user has provided his/her input instructing that the client device 106 transmit a reset request back to the reset server 108. Alternatively, the user authentication may occur as an initial step after the reset notification is received from the reset server 108. In such an embodiment, after the user is properly authenticated, the reset client 108 may then be configured to present a suitable user interface to allow the user to provide his/her input associated with transmitting the reset request. One embodiment of an authentication process that may be used as part of the disclosed method 200 will be described below with reference to FIG. 7. In addition, a registration process for initially registering a new user within the disclosed system 100 will also be described below with reference to FIG. 8.

Referring still to FIG. 5, once the user has been authenticated and has provided his/her user input associated with the transmission of a reset request, the method 200 may, at (218), include actually transmitting the reset request from the client device 106 to the reset server 108. Thereafter, upon receipt of the reset request from the client device 106 (e.g., at 220), the method 200 may include, at (222), transmitting a reset command to the local SCADA system(s) 104 associated with the faulted wind turbine(s) 10 instructing the SCADA system 104 to reset the turbine(s) 10. Additionally, at (224), the method 200 includes receiving the reset command transmitted from the reset server 108 at the local SCADA system(s) 104. Upon receipt of the reset command, the local SCADA system(s) 104 may then, at (226), transmit a suitable control command(s) to the corresponding turbine controller(s) 26 of the faulted wind turbine(s) 10 instructing the controller(s) 26 to reset the wind turbine(s) 10.

Referring now to FIG. 7, a flow diagram of one embodiment of a method 400 for authenticating a user for remotely resetting one or more faulted wind turbines 10 is illustrated in accordance with aspects of the present subject matter. In general, the method 400 will be described herein as being implemented by the client device 106 of the system 100 described above with reference to FIGS. 2 and 3. However, in alternative embodiments, all or part of the disclosed authentication process may be performed at the reset server 108. For example, upon the receipt of authentication data from a user, the data may be transmitted to the reset server 108 to allow the user to be authenticated by the server 108. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (402), the client device 106 may be configured to initially receive a user input associated with a request to open or initiate the reset client application 170. For example, the reset client application 170 may include an associated icon presented on the home screen of the user's device 106. In such an embodiment, when the user selects the icon, the client device 106 may be configured to access suitable instructions stored within the device's memory 162 for initiating the reset client application 170.

Additionally, at (404), the client device 106 may be configured to initiate the reset client application 170 and request initial authentication data from the user. For instance, in one embodiment, upon initiation of the reset client application 170, the client device 106 may be configured to present the user with a suitable interface for providing initial authentication data. It should be appreciated that the initial authentication data may generally correspond to any suitable type of authentication data that may be received or captured by an authentication device(s) 174 of the client device 106. However, in a particular embodiment, the initial authentication data may correspond to a username and password associated with the user of the device 106.

Moreover, at (406) and (408), the client device 10-6 may be configured to receive the initial authentication data from the user and compare such data to the corresponding data stored within its authentication database 168. For example, if the initial authentication data corresponds to a username and password, the user may input his/her username/password using a suitable authentication device 174 (e.g., a touch screen and/or keyboard of the client device 106). Thereafter, upon receipt of such data, the client device 106 may be configured to compare the username/password provided by the user to the corresponding username/password stored within the authentication database 168. If the previously stored authentication data matches the user-provided data, the reset client application 170 may determine that the current user of the client device 106 is authorized to view the data accessible via the reset client application 170, such as a reset notification and/or a fault notification that has been transmitted from the reset server 108. Alternatively, if the stored authentication data does not match the user-provided data, the reset client application 170 may provide an indication to the user (e.g., via a display window) that the username/password provided was not valid and may request that the user attempt to re-enter his/her authentication data.

It should be appreciated that the method elements 404-408 described above with reference to the receipt and analysis of initial authentication data may correspond to optional elements of the method 400 shown in FIG. 7. For example, in another embodiment, the user may be provided direct access to the data accessible via the reset client application 170 upon initiation of the application 170. Alternatively, the user may be provided the option of saving his/her initial authentication data on the client device 106 such that, once the initial authentication data has been properly provided by the user, such data is not required to be input by the user when the reset client application 170 is subsequently accessed by the user.

Referring still to FIG. 7, at (410), the client device 106 may receive a user input associated with a reset request to be transmitted to the reset server 108 (e.g., similar to method element 214 shown in FIG. 5). For example, as indicated above, the reset client application 170 may be configured to display a suitable interface element (e.g., a "reset" button) allowing the user to indicate his/her desire that a faulted wind turbine(s) (10) be reset. As shown in FIG. 7, upon the receipt of such user input, at (412), the reset client application 170 may be configured to request one or more types of secondary authentication data from the user. Similar to the initial authentication data, the secondary authentication data may generally correspond to any suitable type of authentication data that may be received or captured by an authentication device(s) 174 of the client device 106. However, in a particular embodiment of the present subject matter, the secondary authentication data may correspond to biometric data associated with the user. For instance, as indicated above, the client device 106 may include an authentication device(s) 174 configured to acquire fingerprint data, retinal data and/or any other suitable biometric data from the user (e.g., an image of the user's face to be used for facial recognition).

Additionally, at (414) and (416), the client device 106 may be configured to receive the secondary authentication data from the user and compare such data to the corresponding data stored within its authentication database 168. For example, if the secondary authentication data corresponds to fingerprint data, the client device 106 may be configured to compare the fingerprint scan provided by the user to the corresponding fingerprint data stored within the authentication database 168. If the previously stored authentication data matches the user-provided data, the reset client application 170 may determine that the current user of the client device 106 is authorized to reset the faulted wind turbine(s) 10 and may subsequently transmit the reset request to the rest server 108 (e.g., as indicated by method element 218 shown in FIG. 5). Alternatively, if the stored authentication data does not match the user-provided data, the reset client application 170 may provide an indication to the user (e.g., via a display window) that data provided is not valid and may request that the user attempt to re-enter his/her authentication data.

Referring now to FIG. 8, a flow diagram of one embodiment of a method 500 for initially registering a user as an authorized user for remotely resetting one or more faulted wind turbines 10 is illustrated in accordance with aspects of the present subject matter. In general, the method 500 will be described herein as being implemented by the client device 106 of the system 100 described above with reference to FIGS. 2 and 3. However, in alternative embodiments, all or part of the disclosed registration process may be performed at the reset server 108. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

It should be appreciated that a user seeking to register as an authorized user may initially be required to transmit a request (e.g., via his/her client device or using any other suitable means) to gain access to the reset server 108 for receiving notifications and/or resetting one or more faulted wind turbines via his/her client device 106. For example, the user may transmit the request along with the universal unique identification (UUID) code associated with his/her client device 106. A user profile may then be created and stored within the reset server 108 that includes authentication credentials for the user. For example, the user profile may include data associating the user and his/her device 106 (e.g., via the UUID) with one or more wind turbines 10 located at one or more wind farms 102. This association may generally define the wind turbine(s) 10 for which the user may be allowed to receive notifications and/or remotely reset once the registration process is completed. In addition, the user profile may also include data corresponding to an initial username and password that have been associated with the user.

As shown in FIG. 8, at (502), the client device 106 may be configured to receive the authentication credentials associated with the user's profile from the reset server 108. For example, in one embodiment, the authentication credentials may be transmitted to the client device 106 in an encrypted form and may be signed by or otherwise associated with a private key provided by the reset server 106. Thereafter, at (504), the client device 108 may download the reset client application 170 from a suitable source (e.g., a public application market or a private application source) and/or initiate the reset client application 170. Upon initiation of the reset client application 170, the client device, at (506), may cause the authentication credentials received from the reset server 108 to be associated with the reset client application 170. For example, the reset client application 170 may be configured to download or otherwise access the private key provided by the reset server 108 and decrypt the authentication credentials associated therewith.

Additionally, at (508), the client device 106 may be configured to initially authenticate the user by requesting and receiving initial authentication data from the user. For example, as indicated above, the initial authentication data may correspond to a username/password associated with the user. In such an embodiment, the reset client application 170 may configured to present the user with a suitable user interface for inputting his/her username/password and, upon receipt of such data, compare the user-provided username/password with the username/password received from the reset server 108 as part of the user's authentication credentials. Alternatively, the initial authentication data may correspond to any other suitable type of authentication data.

Moreover, at (510), the client device 106 may be configured to transmit an indication to the reset server 108 that the user of the client device has been initially authenticated. Upon receipt of the indication, the reset server 108 may be configured to transmit a temporary, time-sensitive code to the client device 106 (e.g., a six digit, random number set to expire within a predetermined time period, such as five minutes). As shown in FIG. 8, at (512), the client device 106 may then receive the temporary code from the reset server 108 and cause such code to be displayed to the user. For instance, the temporary code may be presented within a suitable user interface provided by the reset client application 170. The user may then be allowed to input the temporary code into the client device 106 prior to its expiration, which is shown in FIG. 8, at (514), as being received by the client device 106.

Following the initial authentication of the user and input by the user of the temporary code, the client device 106 may, at (516), be configured to receive and store secondary authentication data from the user that can be used in the future for authenticating the user. For instance, as indicated above, in one embodiment, the secondary authentication data may correspond to biometric data, such as fingerprint data, retinal data, facial feature data, etc. In such an embodiment, the client device 106 may be configured to request that the user input such data via the authentication device(s) 174 of the client device 106. For example, the user may be asked to place his/her finger adjacent to a fingerprint scanner of the client device 106 to provide fingerprint scan data and/or allow one or more images of the user's eye(s) and/or face to be captured by a camera of the client device 106 to allow subsequent authentication of the user via retinal and/or facial recognition algorithms. The secondary authentication data received from the user may then be stored within the client device 106 (e.g., within the authentication database 168) for use at a later date, such as when performing the method 400 described above with reference to FIG. 7.

Moreover, as shown in FIG. 8, once the secondary authentication data is received from the user and stored on the client device 106, the client device 106 may, at (518), be configured to transmit a notification of the reset server 108 indicating that the registration process has been completed. The reset server 108 may then update the user's profile to indicate that both the user and his/her device 106 have been properly registered. As such, when a fault subsequently occurs on one or more of the wind turbines 10 associated with the user, the reset server 108 may transmit a suitable notification(s) to the user's device 106 to inform that user of the fault and/or to allow the user to reset the faulted wind turbine(s) 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for resetting faulted wind turbines, the method comprising:
   receiving, with a computing device, fault data associated with a turbine fault that has occurred with respect to a faulted wind turbine;
   analyzing, with the computing device, one or more reset conditions associated with the turbine fault;
   determining, with the computing device, whether the faulted wind turbine is remotely resettable based on the one or more reset conditions associated with the turbine fault;
   if the turbine fault is remotely resettable, transmitting, with the computing device, a reset notification to a client device authorized to receive notifications for the wind turbine, the reset notification indicating that the faulted wind turbine can be remotely reset; and
   in response to receipt of a reset request, transmitting, with the computing device, a reset command to a second computing device configured to control the operation of the faulted wind turbine,
   wherein the reset command instructs the second computing device to reset the faulted wind turbine.

2. The method of claim 1, further comprising receiving the reset request from the client device in response to the reset notification.

3. The method of claim 1, wherein the second computing device corresponds to a local SCADA system of a wind farm within which the faulted wind turbine is located.

4. The method of claim 1, wherein each of the one or more reset conditions is classified as a remotely resettable condition or a non-remotely resettable condition.

5. The method of claim 1, further comprising, if the turbine fault is not remotely resettable, transmitting a fault notification to the client device, the fault notification indicating that the turbine fault has occurred with respect to the faulted wind turbine.

6. The method of claim 1, further comprising:
   identifying a specific fault corresponding to the turbine fault based on the fault data; and
   identifying the one or more reset conditions associated with the turbine fault based on the identification of the specific fault.

7. The method of claim 1, further comprising:
   storing authentication credentials associated with a user of the client device; and
   transmitting the authentication credentials to the client device.

8. The method of claim 7, wherein the authentication credentials include at least one of an association between the user of the client device and one or more wind turbines or a username and password for the user.

9. The method of claim 7, wherein the authentication credentials are encrypted and are associated with a private key provided by the computing device.

10. The method of claim 1, further comprising:
    receiving an indication that a user of the client device has been initially authenticated; and
    in response to receipt of the indication, transmitting a time-sensitive code to the client device.

11. The method of claim 1, further comprising receiving an indication that a user of the client device has been authenticated using biometric authentication data.

12. A system for remotely resetting faulted wind turbines, the system comprising:
    a computing device including one or more processors and associated memory, the memory storing instructions that, when implemented by the one or more processors, configure the computing device to:
    receive fault data associated with a turbine fault that has occurred with respect to a faulted wind turbine;
    analyze one or more reset conditions associated with the turbine fault;
    determine whether the faulted wind turbine is remotely resettable based on the one or more reset conditions associated with the turbine fault;
    if the turbine fault is remotely resettable, transmit a reset notification to a client device authorized to receive notifications for the wind turbine, the reset notification indicating that the faulted wind turbine can be remotely reset; and
    in response to receipt of a reset request, transmit a reset command to a second computing device configured to control the operation of the faulted wind turbine,
    wherein the reset command instructs the second computing device to reset the faulted wind turbine.

13. The system of claim 12, wherein the computing device is configured to receive the reset request from the client device in response to the reset notification.

14. The system of claim 12, wherein the second computing device corresponds to a local SCADA system of a wind farm within which the faulted wind turbine is located.

15. The system of claim 12, wherein, if the turbine fault is not remotely resettable, the computing device is configured to transmit a fault notification to the client device, the fault notification indicating that the turbine fault has occurred with respect to the faulted wind turbine.

16. The system of claim 12, wherein the computing device is further configured to:
    identify a specific fault corresponding to the turbine fault based on the fault data; and
    identify the one or more reset conditions associated with the turbine fault based on the identification of the specific fault.

17. The system of claim 12, wherein the computing device is further configured to:
    store authentication credentials associated with a user of the client device; and
    transmit the authentication credentials to the client device.

18. The system of claim 17, wherein the authentication credentials include at least one of an association between the user of the client device and one or more wind turbines or a username and password for the user.

19. The system of claim 12, wherein the computing device is further configured to:
    receive an indication that a user of the client device has been initially authenticated; and
    in response to receipt of the indication, transmit a time-sensitive code to the client device.

20. The system of claim 12, wherein the computing device is further configured to receive an indication that a user of the client device has been authenticated using biometric authentication data.

* * * * *